US010063733B2

(12) United States Patent
Sakatani (10) Patent No.: US 10,063,733 B2
(45) Date of Patent: Aug. 28, 2018

(54) ALIGNMENT SHEET, IMAGE FORMING APPARATUS AND METHOD FOR ALIGNING IMAGE FORMING POSITION (71) Applicant: Konica Minolta, Inc., Chiyoda-ku, Tokyo (JP)

(72) Inventor: Kazuomi Sakatani, Sagamihara (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/790,049

(22) Filed: Jul. 2, 2015

(65) Prior Publication Data
US 2016/0021278 A1 Jan. 21, 2016

(30) Foreign Application Priority Data

Jul. 17, 2014 (JP) ................................ 2014-146382

(51) Int. Cl.
H04N 1/203 (2006.01)
H04N 1/00 (2006.01)

(52) U.S. Cl.
CPC ....... H04N 1/2036 (2013.01); H04N 1/00761 (2013.01)

(58) Field of Classification Search
None
See application file for complete search history.

(56) References Cited

U.S. PATENT DOCUMENTS

| 2004/0085378 A1* | 5/2004 | Sievert | B41J 29/393 |
| | | | 347/19 |
| 2005/0219590 A1* | 10/2005 | Andersen | H04N 1/00002 |
| | | | 358/1.12 |
| 2005/0286922 A1 | 12/2005 | Oki | |
| 2011/0292478 A1* | 12/2011 | Ishii | H04N 1/40006 |
| | | | 358/518 |

FOREIGN PATENT DOCUMENTS

| JP | 4438943 B2 | 3/2010 |
| JP | 2015-228012 A | 12/2015 |

OTHER PUBLICATIONS

Notification of Reasons for Refusal dated Oct. 4, 2016 issued in the corresponding Japanese Application No. 2014-146382 and English translation (7 pages).

* cited by examiner

Primary Examiner — Lennin Rodriguezgonzale
(74) Attorney, Agent, or Firm — Buchanan Ingersoll & Rooney PC (57) ABSTRACT An alignment sheet for alignment of an image forming position of a sheet includes a first side and a second side. The first side has a reference image which is formed in a periphery of the first side and which is used for measuring a position of an image on the first side. The second side has a background image with a predetermined area which is formed at a location where the background image does not overlap the reference image. The reference image and the background image are read at the same time by an image

(Continued)

reading section while an area with the reference image is folded such that the background image appears as a background.

10 Claims, 9 Drawing Sheets

ALIGNMENT SHEET, IMAGE FORMING APPARATUS AND METHOD FOR ALIGNING IMAGE FORMING POSITION

BACKGROUND OF THE INVENTION

1. Field of the Invention

The present invention relates to an alignment sheet, an image forming apparatus and a method for aligning an image forming position.

2. Description of Related Art

Image forming apparatuses having a duplex image forming function of forming images on both sides of a sheet that are in widespread use include printers, copiers and multifunction peripherals.

Regarding duplex image forming, it is generally known that even when the apparatus is controlled so that the image forming positions on the front and back sides of a sheet are aligned with each other, misalignment between the image forming position on the front and back sides occurs in practice due to sheet shrinkage that occurs in the developing, transferring and fixing steps of the image forming on the first side.

To cope with the problem, the image forming position is normally corrected by using a preset correction value when an image is formed on the second side.

A method for calculating a correction value has been proposed, which involves providing a sheet (reference chart) with reference marks formed at the four corners of both sides, reading both sides of the reference chart with an image reading unit to calculate the distance from an edge to each mark on both sides, and determining the correction value from the difference between the calculated distances (for example, see JP 4438943B).

However, in the method described in JP 4438943B, a sheet (assist member) that has a different brightness and a larger size to that of the reference chart is placed on the back side of the reference chart while reading the reference chart so that the edges of the reference chart are emphasized and that the distance from an edge to each mark is precisely calculated.

Therefore, the calculation of a correction value requires the assist member in addition to the reference chart, which makes the process complicated.

SUMMARY OF THE INVENTION

The present invention was made in view of the above-described problem with the prior art, and an object thereof is to provide an alignment sheet, an image forming apparatus and a method for aligning an image forming position, which allows accurate alignment of an image forming position on a sheet with a simple process.

In order to realize the above object, according to a first aspect of the present invention, there is provided an alignment sheet for alignment of an image forming position of a sheet, including: a first side having a reference image which is formed in a periphery of the first side and which is used for measuring a position of an image on the first side; and a second side having a background image with a predetermined area which is formed at a location where the background image does not overlap the reference image, wherein the reference image and the background image are read at the same time by an image reading section while an area with the reference image is folded such that the background image appears as a background.

Preferably, the alignment sheet further includes: a folding position indicator image which is formed on the second side and which specifies a folding position, wherein, by folding the area with the reference image at the folding position specified by the folding position indicator image, an edge of the area with the reference image is placed on top of the background image.

Preferably, in the alignment sheet, the folding position indicator image is constituted by a folding line, a mark to which the edge of the area is folded or a mark provided in the second image.

Preferably, the alignment sheet further includes: a second reference image which is formed in a periphery of the second side and which is used for measuring a position of an image on the second side; and a second background image with a predetermined area which is formed on the first side at a location where the second background image does not overlap the second reference image, wherein the second reference image and the second background image are read at the same time by the image reading section while an area with the second reference image is folded such that the second background image appears as a background.

Preferably, in the alignment sheet, the background image and the second background image are different from each other in figure, density or color.

Preferably, in the alignment sheet, the reference image and the second reference image are different from each other in figure.

According to a second aspect of the present invention, there is provided an image forming apparatus, including: storage section which stores an alignment image data for forming the alignment sheet; an image forming section which forms the alignment image on a sheet based on the alignment image data; an image reading section which reads the alignment sheet on which the alignment image is formed; and a control section which calculates a correction value which corrects the image forming position on the sheet based on image data obtained by the image reading section, wherein the image reading section simultaneously reads the reference image and the background image from the alignment sheet while the area with the reference image is folded such that the background image appears as a background.

Preferably, in the image forming apparatus, the storage section stores a plurality of different alignment image data, and the control section selects the alignment image data for forming the alignment sheet based on a size of a filled area in past image forming.

According to a third aspect of the present invention, there is provided a method for aligning an image forming position, including the steps of: an outputting step of outputting the alignment sheet; a reading step of reading the alignment sheet output in the outputting step while the alignment sheet is folded; and a calculating step of calculating a correction value which corrects the image forming position on the sheet based on image data obtained in the reading step.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

Hereinafter, an embodiment of the present invention will be described with reference to the drawings. Though various technical limitations which are preferable to perform the present invention are included in the after-mentioned embodiment, the scope of the invention is not limited to the following embodiment and the illustrated examples.

Figure 1:
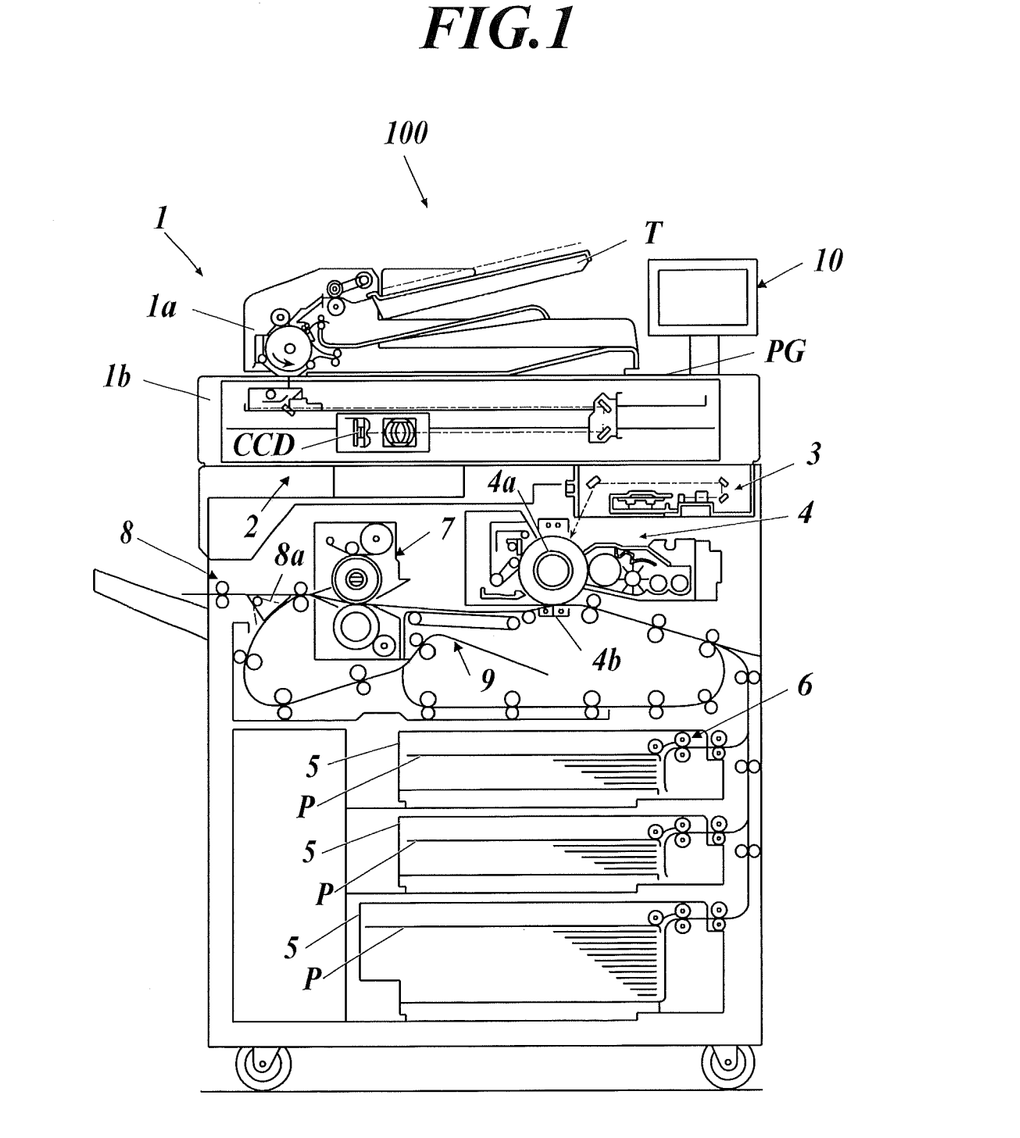
FIG. 1 is an overall schematic diagram of an image forming apparatus according to an embodiment of the present invention.
Figure 2:
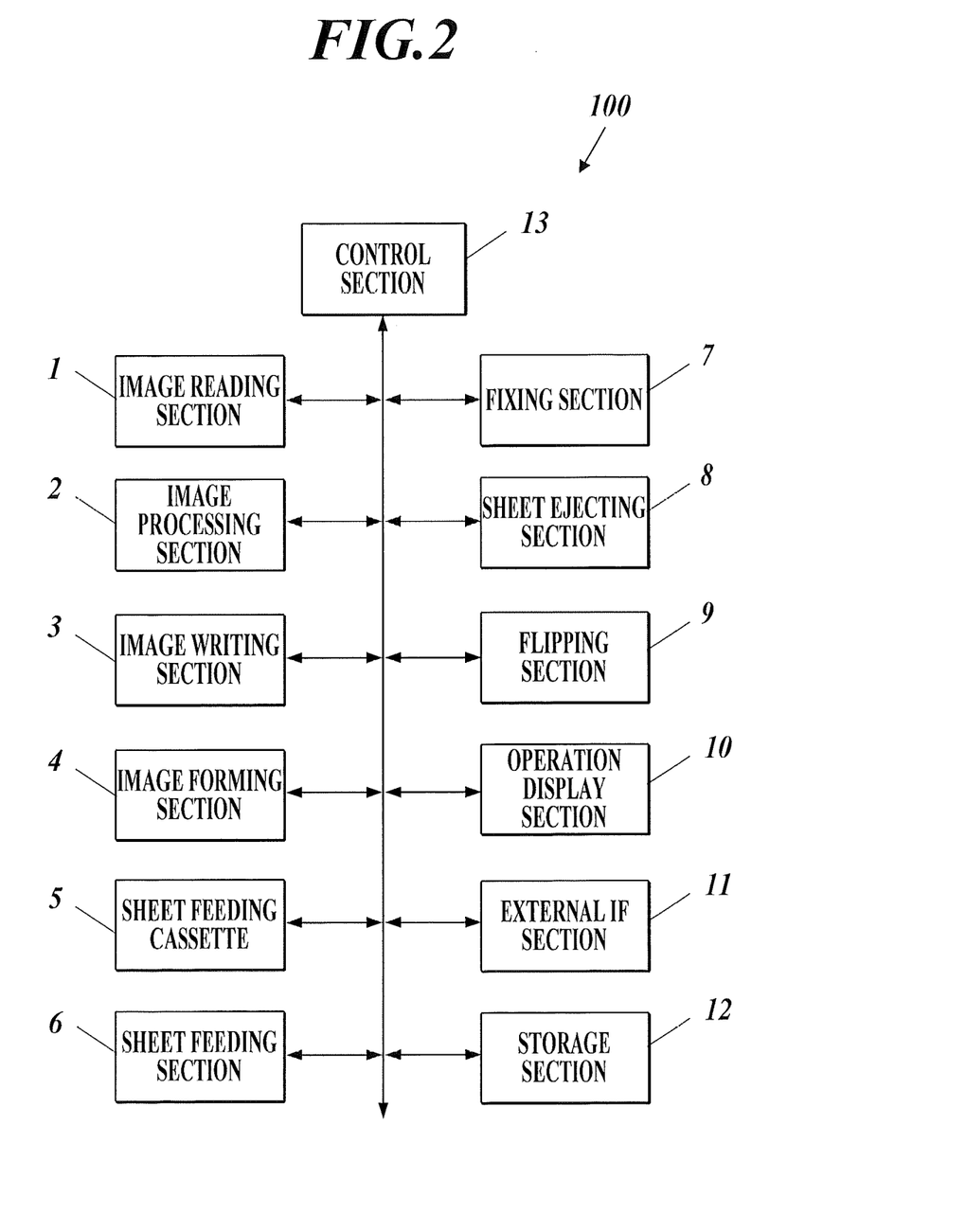
FIG. 2 is a block diagram illustrating the control configuration of the image forming apparatus of FIG. 1.

FIG. 1 is an overall schematic diagram of an image forming apparatus 100 according to the embodiment of the present invention. FIG. 2 is a block diagram illustrating the control configuration of the image forming apparatus 100.

As illustrated in FIG. 1 and FIG. 2, the image forming apparatus 100 includes an image reading section 1, an image processing section 2, an image writing section 3, an image forming section 4, a sheet feeding cassette 5, a sheet feeding section 6, a fixing section 7, a sheet ejecting section 8, a flipping section 9, a control display section 10, a storage section 11, an external IF (interface) section 12, a control section 13, and the like.

The image reading section 1 includes an ADF (auto document feeder) section 1a and a scanner section 1b.

The ADF section 1A conveys an original document placed on a document tray T to a platen glass PG where an image is read.

According to a read command from the control section 13, the scanner section 1b reads an image of an original document placed on or conveyed to a scanning area of the platen glass PG as an optical image through a predetermined optical system, and the read optical image is photoelectrically converted by the CCD (charge coupled device) image sensor.

The image processing section 2 applies analog processing, A/D conversion, shading correction, image compression and the like to the analog signal photoelectrically converted by the CCD image sensor, and thereafter sends the image signal to the image writing section 3.

Based on the acquired image signal, the image writing section 3 irradiates a photoreceptor drum 4a of the image forming section 4 with light from a semiconductor laser so as to form an electrostatic latent image on the surface of the photoreceptor drum 4a.

The image forming section 4 develops the latent image formed on the photoreceptor drum 4a so as to form a toner image. The image forming section 4 transfers the toner image onto a sheet P with the transferring section 4b by pressing the sheet P against the photoreceptor drum 4a, the sheet P having been fed from the sheet feeding cassette 5 by the sheet feeding section 6. The sheet P onto which the toner image has been transferred is then conveyed to the fixing section 7.

The fixing section 7 forms an image on the sheet P by applying heat and pressure so as to fix the toner image to the sheet P onto which the toner image has been transferred by the forming section 4. The sheet with the formed image is then ejected from the sheet ejecting section 8.

When forming images on both sides of the sheet P, an image is formed on one side (front side, first side) of a sheet P by passing the sheet P through the fixing section 7, after which it is conveyed by the conveyance path switching plate 8a to the flipping section 9 where it is flipped. Thereafter, the image forming section 4 and the fixing section 7 form an image again on the other side (back side, second side) of the sheet P. The sheet P onto which images have been formed on both sides is then ejected from the sheet ejecting section 8.

The operation display section 10 includes a touch panel display with an LCD (liquid crystal display). The operation display section 10 displays various setting screens, the status of the apparatus, the operating status of various functions and the like on the display screen thereof according to a display signal input from the control section 13.

The touch panel display is configured such that the display screen of the LCD is covered with a pressure-sensitive (resistive) touch panel composed of transparent electrodes arranged in a matrix. The touch panel display detects the coordinate of a point pushed by a finger, a touch pen or the like as a voltage value and outputs the detected location signal to the control section 13 as an operation signal.

The control display section 10 is used, for example, for setting the mode to a simplex image forming mode, a duplex image forming mode and a duplex alignment mode.

The simplex image forming mode refers to a process of forming and outputting an image only on one side of the sheet P.

The duplex image forming mode refers to a process of forming images on both sides of the sheet P.

The duplex alignment mode refers to a process of adjusting the setting of the image forming position so as to align the image forming positions on the two sides, which is performed before images are formed on both sides of the sheet P. Specifically, the duplex alignment mode involves outputting an alignment sheet S onto which predetermined images are formed on both sides based on a predetermined alignment image data, then detecting the misalignment amount between the image forming positions on the two sides of the sheet P on the basis of image data obtained by reading the alignment sheet S and calculating a correction value for aligning the image forming positions from the misalignment amount. Details of the alignment sheet S will be described below.

The storage section 11 includes, for example, a flash memory, an EEPROM (electrically erasable programmable read only memory) and the like. The storage section 11 is configured such that information is readable and writable.

The storage section 11 stores the alignment image data for forming the alignment sheet S.

The storage section 11 stores the correction value calculated by the image forming position alignment, which is described below.

The external IF section 12 is an interface for performing data communication with an external device such as a PC (personal computer) by connecting to a communication network such as a LAN (local area network).

The control section 13 integrally controls the sections of the image forming apparatus 100 according to a command input from the display control section 10 or the external IF section 12.

The control section 13 includes a CPU (central processing unit), a ROM (read only memory), a RAM (random access memory) (none of which are shown) and the like. The CPU reads a program stored in the ROM and develops it to a work area of the RAM so as to execute various processing in cooperation with the program.

Specifically, for example, the control section 13 performs the image forming position alignment in the duplex alignment mode. That is, the control section 13 outputs the alignment sheet S, allows the scanner section 1b to read the images formed on both sides of the output alignment sheet S, detects the misalignment amount between the image forming positions on the two sides of the sheet P based on the read image data, and calculates the correction value for aligning the image forming position based on the detected misalignment amount.

Figure 3:
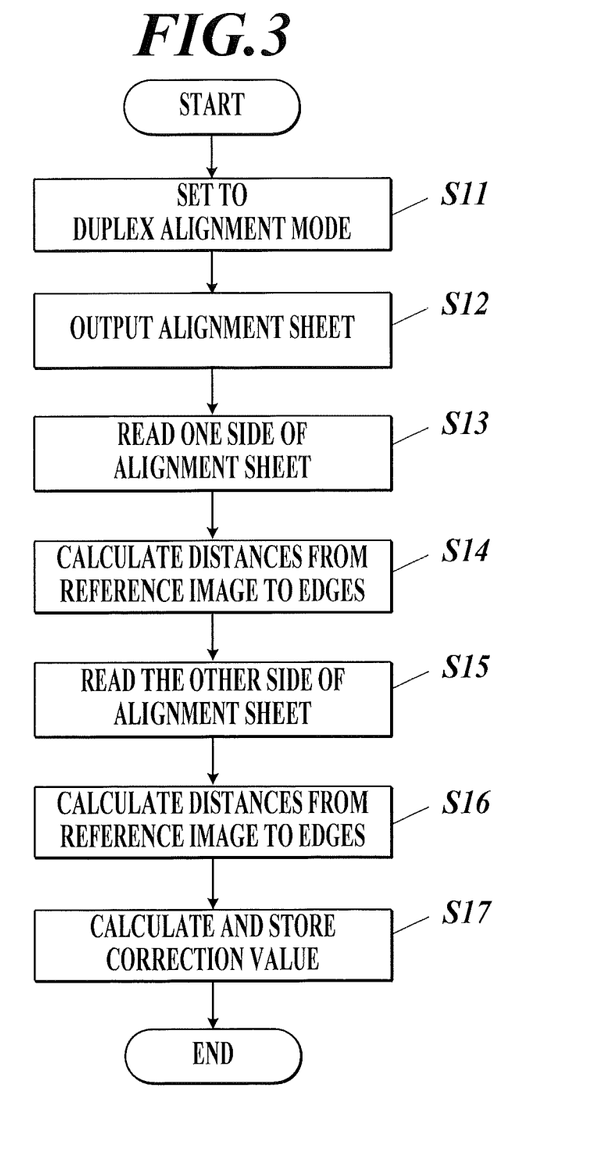
FIG. 3 is a flowchart illustrating the process of image forming position alignment.

Hereinafter, the image forming position alignment in the duplex alignment mode will be described in more detail. FIG. 3 is a flowchart illustrating the process of the image forming position alignment.

The duplex alignment mode starts in response to a user operation of selecting the duplex alignment mode on the operation display section 10.

That is, in response to a user operation of selecting the duplex alignment mode on the operation display section 10, the control section 13 sets (changes) the mode to the duplex alignment mode according to an operation signal from the operation display section 10 (Step S11).

Then, the control section 13 forms predetermined alignment images on the two sides of the sheet P having a predetermined type and size based on the alignment image data for the alignment sheet S stored in the storage section 11, and then outputs it as the alignment sheet S (Step S12, outputting step).

Figure 4A:
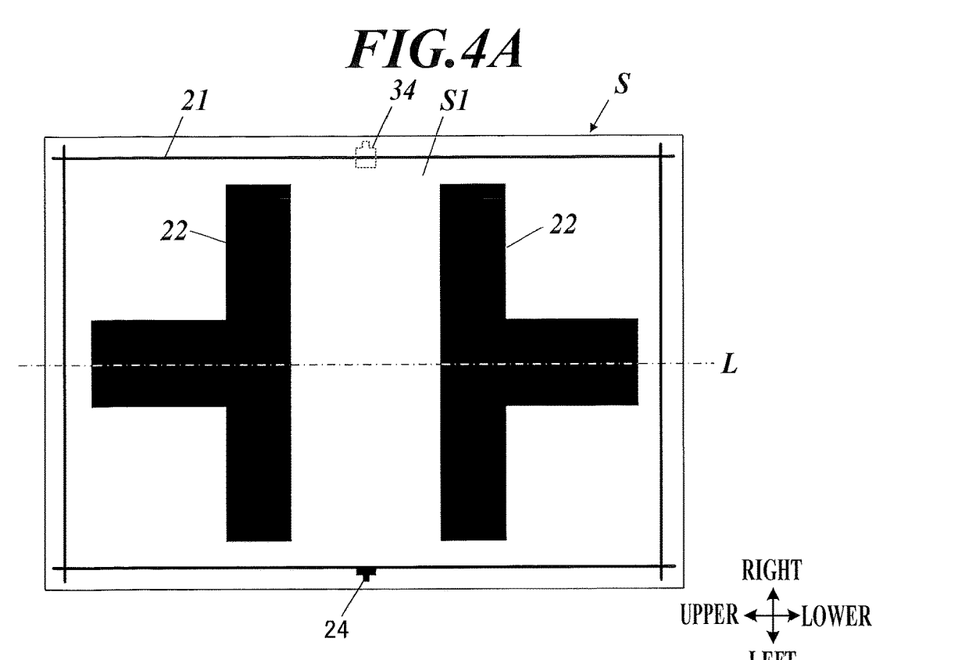
FIG. 4A illustrates an example of the front side of an alignment sheet.
Figure 4B:
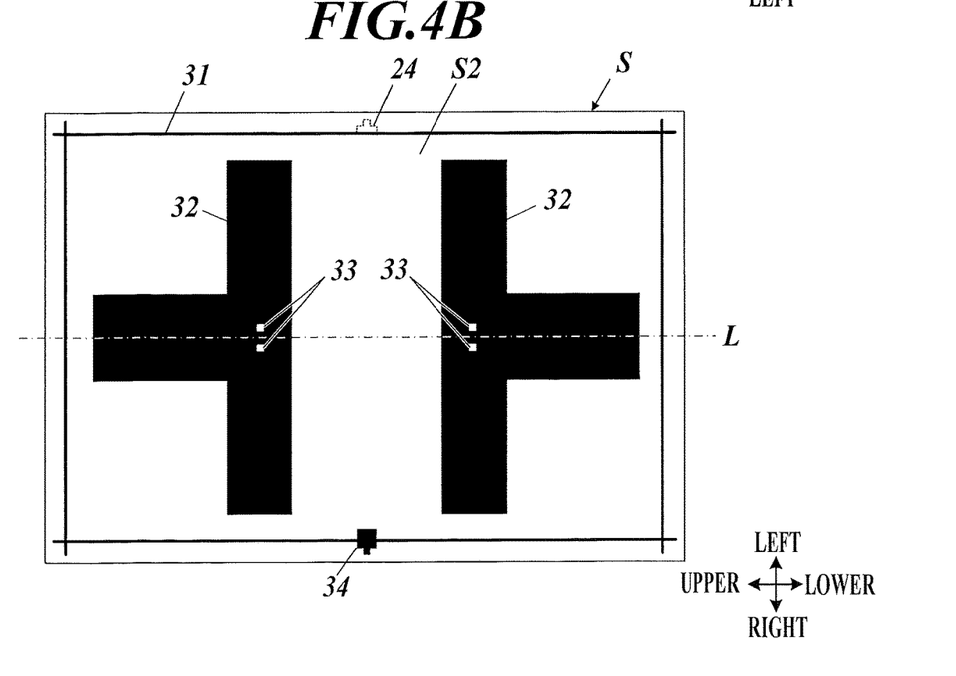
FIG. 4B illustrates an example of the back side of an alignment sheet.

FIG. 4A and FIG. 4B illustrate an example of the alignment sheet S.

FIG. 4A illustrates one side (front side, first side) S1 of the alignment sheet S, and FIG. 4B illustrates the other side (back side, second side) S2 of the alignment sheet S.

The alignment sheet S has a virtual center axis L in the longitudinal direction at the center in the transverse direction. Further, an end of the alignment sheet S in the longitudinal direction is referred to as an upper side, and the other end is referred to as a lower side. An end of the alignment sheet S in the transverse direction is referred to as a right side, and the other end is referred to as a left side.

As illustrated in FIG. 4A, a rectangular frame 21 with cross corners is formed along the periphery of the front side S1 of the alignment sheet S as a reference image.

Further, on the front side S1 of the alignment sheet S, solid black T-shaped FIGS. 22, 22 having a predetermined area are formed as a second background image in the center area in which they do not overlap a frame 31 formed on the back side S2.

Further, on the front side S1 of the alignment sheet S, a direction mark 24 for specifying the direction of the alignment sheet S is formed at the center of one side.

As illustrated in FIG. 4B, the rectangular frame 31 with cross corners is formed along the periphery of the back side S2 of the alignment sheet S as a second reference image.

Further, on the back side S2 of the alignment sheet S, solid black T-shaped FIGS. 32, 32 having a predetermined area are formed as a background image in the center area in which they do not overlap the frame 21 on the front side S1.

Further, in each of the solid FIGS. 32, 32, two solid white rectangular marks 33, 33 are provided as a folding position indicator image. The figure of the marks 33 is not limited to a rectangle, and may be any figure such as a circle and a polygon.

Further, on the back side S2 of the alignment sheet S, a direction mark 34 for specifying the direction of the alignment sheet S is formed at the center of one side. The direction mark 24 and the direction mark 34 are formed at locations that do not overlap each other. Further, it is preferred that the direction mark 24 and the direction mark 34 have different figures so that the front side S1 and the back side S2 are distinguishable from each other. In the example of FIG. 4A and FIG. 4B, the direction mark 24 on the front side S1 has a smaller figure than the direction mark 34 on the back side S2.

As used herein, the reference image (frame 21 and frame 31) is an image that is used as a reference for measuring the position of an image (image forming position) on the sheet P, and the distance from the edges of the sheet P is previously set as an initial setting.

The background images (solid FIGS. 22, 22 and solid FIGS. 32, 32) are an image that serves as a background when the alignment sheet S is folded in the process of the image forming position alignment according to this embodiment.

The folding position indicator image (marks 33, 33) is an image that indicates the folding position when the alignment sheet S is folded in the process of the image forming position alignment according to this embodiment.

The four corners of the alignment sheet S as described above are folded inward by a user.

Figure 5A:
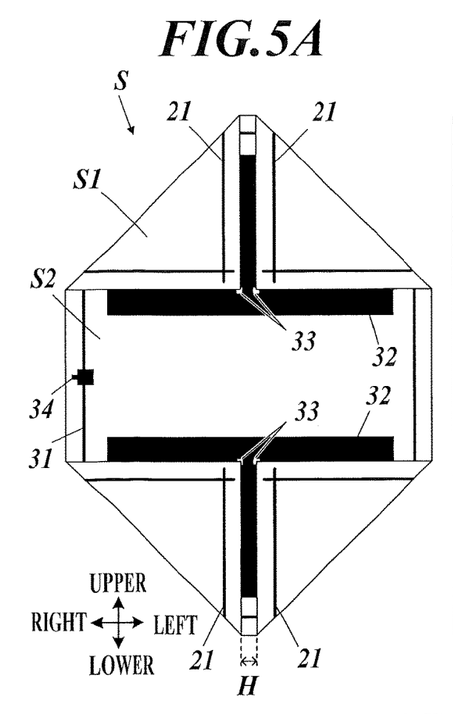
FIG. 5A illustrates an example of a folded alignment sheet.

FIG. 5A illustrates an example of the folded alignment sheet S.

As illustrated in FIG. 5A, the corners of the front side S1 of the alignment sheet S are folded inward so that the solid FIGS. 32, 32 on the back side S2 appear as a background.

In this regard, the alignment sheet S is folded such that the tips of the respective corners of the front side S1 are located in the marks 33, 33 provided in the solid FIGS. 32, 32. Accordingly, the folded parts do not overlap each other, and suitable gaps H are left between them.

By folding the alignment sheet S as described above, the edges of the corners of the front side S1 are emphasized by the solid FIGS. 32, 32.

The folded alignment sheet S is placed on the platen glass PG of the scanner section 1b with the folded parts facing downward.

Figure 5B:
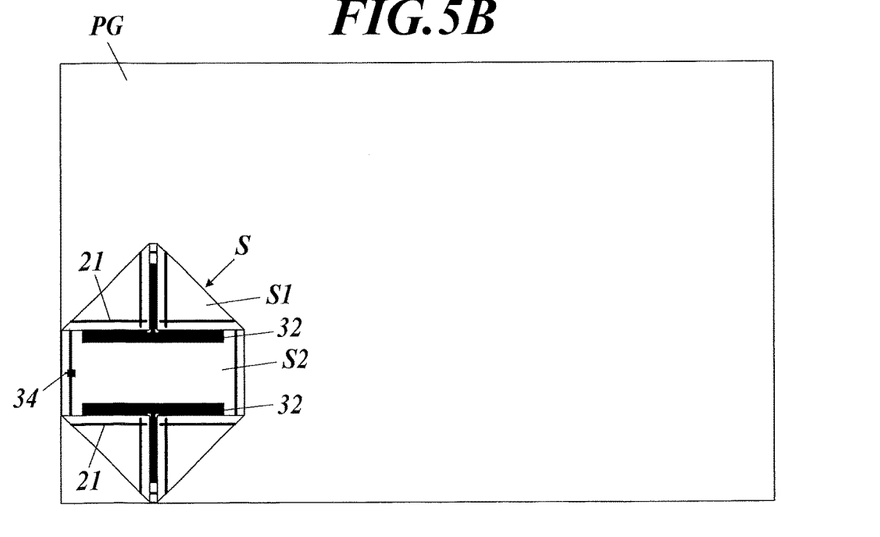
FIG. 5B illustrates an example of the alignment sheet of FIG. 5A in a reading step.

FIG. 5B illustrates an example of the alignment sheet S placed on the platen glass PG, viewed from below.

As illustrated in FIG. 5B, it is preferred that a side edge (right side edge in FIG. 5B) of the alignment sheet S is aligned with a side edge of the platen glass PG.

When the folded alignment sheet S is placed on the platen glass PG and a user operates the operation display section 10 to give a read command, the control section 13 allows the image reading section 1 to read the alignment sheet S according to the operation signal from the operation display section 10 (Step S13, reading step).

Figure 5C:
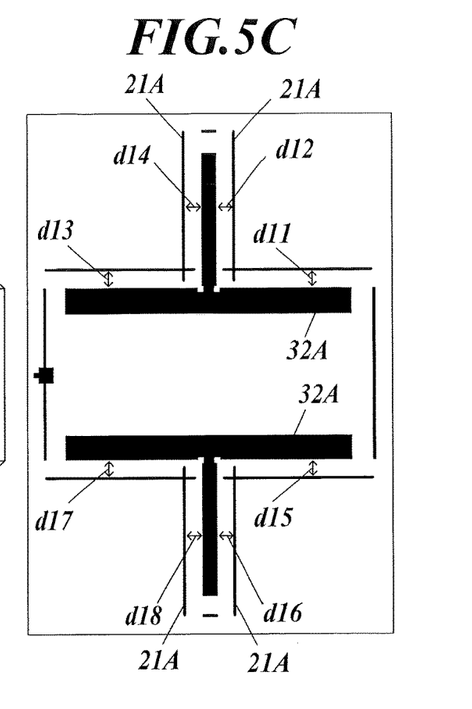
FIG. 5C illustrates an example of read data.

FIG. 5C illustrates an example of the read image data of the alignment sheet S.

Since the alignment sheet S is folded, the frame 21 on the front side S1 and the solid FIG. 32 on the back side S2 are read at the same time as illustrated in FIG. 5C, and the data thus obtained contains both the image data 21A derived from the frame 21 on the front side S1 and the image data 32A derived from the solid FIG. 32 on the back side S2.

Then, the control section 13 calculates the distances d11 to d18 from the frame 21 to the edges of the sheet P based on the read image data of the alignment sheet S (Step S14).

Since the edges around the corners of the front side S1 are emphasized by the solid FIGS. 32, 32 in the image data of the alignment sheet S, the distances d11 to d18 from the frame 21 (image data 21A) to the edges of the sheet P can be precisely calculated.

Each of the distances d11 to d18 may be calculated as an average of the values at several points. In this case, longer emphasized edges around the corners of the front side S1 enable an increase in the number of data. Accordingly, it is preferred that the solid FIG. 32 have a larger area.

Figure 6A:
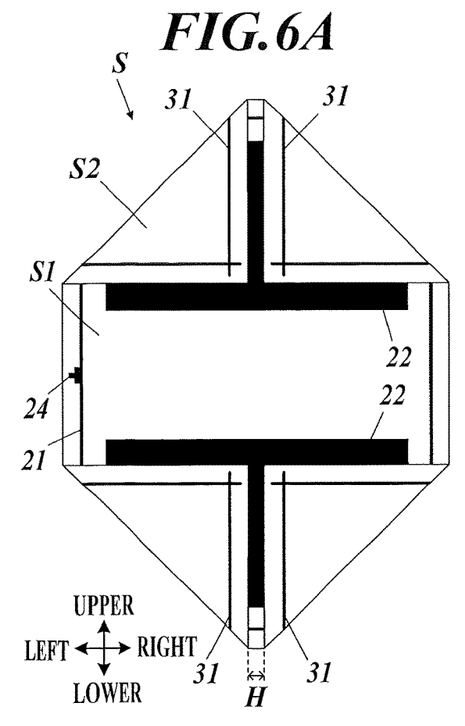
FIG. 6A illustrates an example of an alignment sheet that is folded to the opposite side.

Then, the alignment sheet S is folded by a user such that the other side is folded inward.

FIG. 6A illustrates an example of the folded alignment sheet S in which the other side is folded inward.

As illustrated in FIG. 6A, the corners on the back side S2 of the alignment sheet S are folded so that the solid FIGS. 22, 22 of the front side S1 appear as a background.

In this step, the sheet P is folded along the already formed creases. Accordingly, the folded parts do not overlap each other, and gaps H are left between them.

By folding the alignment sheet S as described above, the edges around the corners of the back side S2 are emphasized by the solid FIGS. 22, 22.

The folded alignment sheet S is placed on the platen glass PG of the scanner section 1b with the folded parts facing downward.

Figure 6B:
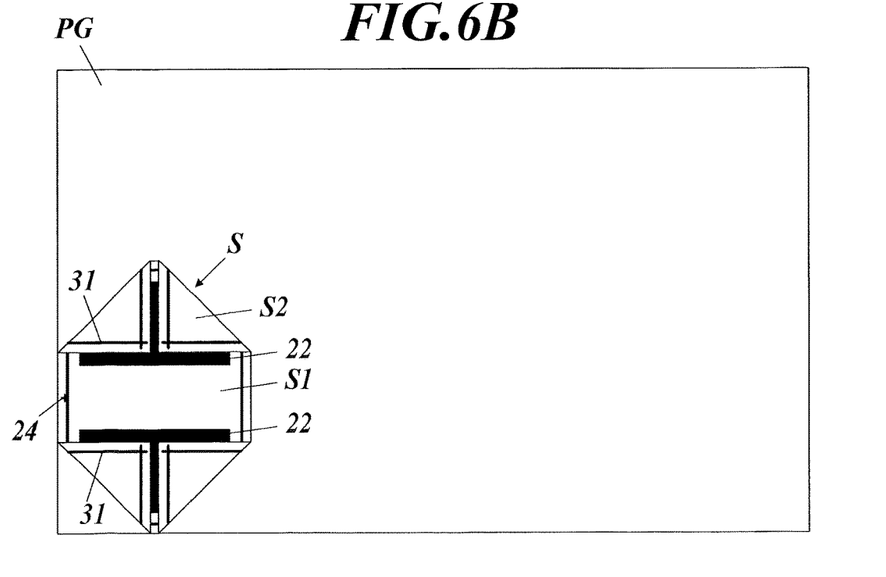
FIG. 6B illustrates an example of the alignment sheet of FIG. 6A in a reading step.

FIG. 6B illustrates an example of the alignment sheet S placed on the platen glass PG, viewed from below.

As illustrated in FIG. 6B, it is preferred that the alignment sheet S is flipped around the virtual center axis L in the longitudinal direction of the alignment sheet S as the rotation axis. That is, it is preferred that the other side edge (left side edge in FIG. 6B) is aligned with the side edge of the platen glass PG.

When the folded alignment sheet S is placed on the platen glass PG and a user operates the operation display section 10 to give a read command, the control section 13 allows the image reading section 1 to read the alignment sheet S according to the operation signal from the operation display section 10 (Step S15, reading step).

Figure 6C:
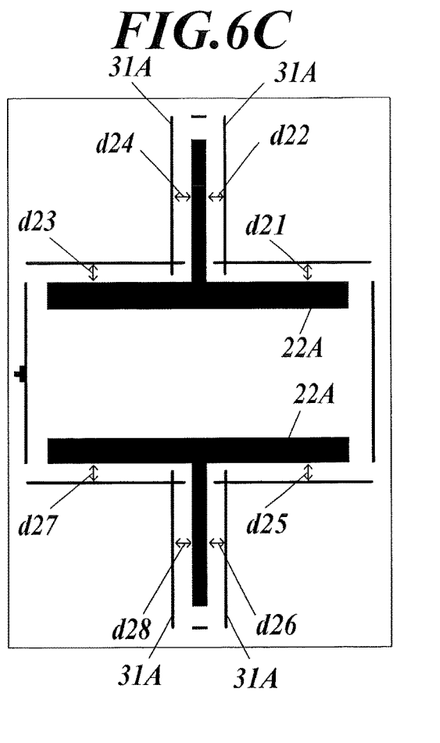
FIG. 6C illustrates an example of read data.

FIG. 6C illustrates an example of the read image data of the alignment sheet S.

Since the alignment sheet S is folded, the frame 31 on the back side S2 and the solid FIG. 22 on the front side S1 are read at the same time as illustrated in FIG. 6C, and the data thus obtained contains both of image data 31A derived from the frame 31 on the back side S2 and image data 22A derived from the solid FIG. 22 on the front side S1.

Then, the control section 13 calculates the distances d21 to d28 from the frame 31 to the edges of the sheet P based on the read image data of the alignment sheet S (Step S16, calculating step).

Since the edges around the corners of the back side S2 are emphasized by the solid FIGS. 22, 22 in the image data of the alignment sheet S, the distances d21 to d28 from the frame 31 (image data 31A) to the edges of the sheet P can be precisely calculated.

In the initial setting, the distances d21 to d28 from the frame 31 to the edges of the sheet P are set to the same as the distances d11 to d18 from the frame 21 to the edges of the sheet P.

However, for example, the sheet may shrink during the developing, transferring and fixing steps in the image forming on the front side S1. In such cases, the image forming positions are misaligned with each other when the image forming on the back side S2 is performed with the initial setting. As a result, the distances d21 to d28 from the frame 31 to the edges of the sheet P differ from the distances d11 to d18 from the frame 21 to the edges of the sheet P.

Then, the control section 13 compares the distances d11 to d18 calculated in Step S14 with the distances d21 to d28 calculated in Step S16 to detect the misalignment length. The control section 13 calculates the correction value for aligning the image forming position of the front side S1 and/or the back side S2 so as to eliminate the misalignment length. The control section 13 stores the correction value in the storage section 11, and then terminates the process.

In the step of reading the alignment sheet S of the above-described process, a side edge of the alignment sheet S is aligned with a side edge of the platen glass PG. Further, in the step of flipping the alignment sheet S, it is flipped around the virtual center axis L, which is parallel to the longitudinal direction of the alignment sheet S, as a rotation axis.

Accordingly, the distances d11 to d18 and the distances d21 to 28 are calculated from the data that are read at close positions on the platen glass PG. Therefore, the values can be calculated more precisely.

Through the above-described process, the correction value for eliminating a misalignment of the image forming positions between the two sides of the sheet P is calculated. Aligned image forming positions between the two sides can be achieved by applying the correction value in the subsequent image forming in the duplex image forming mode.

As described above, according to this embodiment, the alignment sheet S, which is used for the image forming position alignment in duplex image forming on the sheet P, has the frame 21 along the periphery of the front side S1 for measuring the image position on the front side S1 and also has the solid FIG. 32 with a predetermined area on the back side S2 at the location where they do not overlap the frame 21. The frame 21 and the solid FIG. 32 are read at the same time by the image reading section 1 in which areas with the frame 21 are folded such that the solid FIG. 32 appear as a background.

Accordingly, in the image data of the alignment sheet S obtained from the alignment sheet S, the edges of the areas with the frame 21 are emphasized by the solid FIG. 32. Therefore, the distances from the frame 21 to the edges can be calculated precisely, which enables the precise correction value to be obtained.

The alignment sheet S allows the precise correction value to be obtained only by folding it as described above, and this simple process enables accurate image forming position alignment.

In this embodiment, the marks 33 for indicating the folding positions are formed on the back side S2. By folding the alignment sheet S to the positions indicated by the marks 33, the edges of the areas with the frame 21 are placed on top of the solid FIG. 32.

Accordingly, the folded areas do not overlap each other, and suitable gaps H are left between them.

In this embodiment, the marks 33 for indicating the folding positions are solid white figures provided in the solid FIG. 32.

This allows easy adjustment of the folding positions and thus facilitates the folding process.

In this embodiment, the frame 31 for measuring the image position on the back side S2 is formed along the periphery of the back side S2, and the solid FIG. 22 with a predetermined area are formed on the front side S1 at the location where they do not overlap the frame 21. In the condition in which the areas with the frame 31 are folded so that the solid FIG. 22 appear as a background, the image reading section 1 simultaneously reads the frame 31 and the solid FIG. 22.

This allows the correction value to be obtained by comparing the values obtained from both of the front side S1 and the back side S2.

The above-described embodiment is an example in which the distances from the reference image to the edges are detected on both sides of the alignment sheet S, and the detected distances are compared to each other to obtain the correction value. Instead, the distances from the reference image to the edges may be detected on each side of the alignment sheet S, and the detected distances may be compared to a predefined value.

Further, the alignment image of the above-described embodiment formed on the alignment sheet S is merely an example, and various other images can also be used.

Figure 7A:
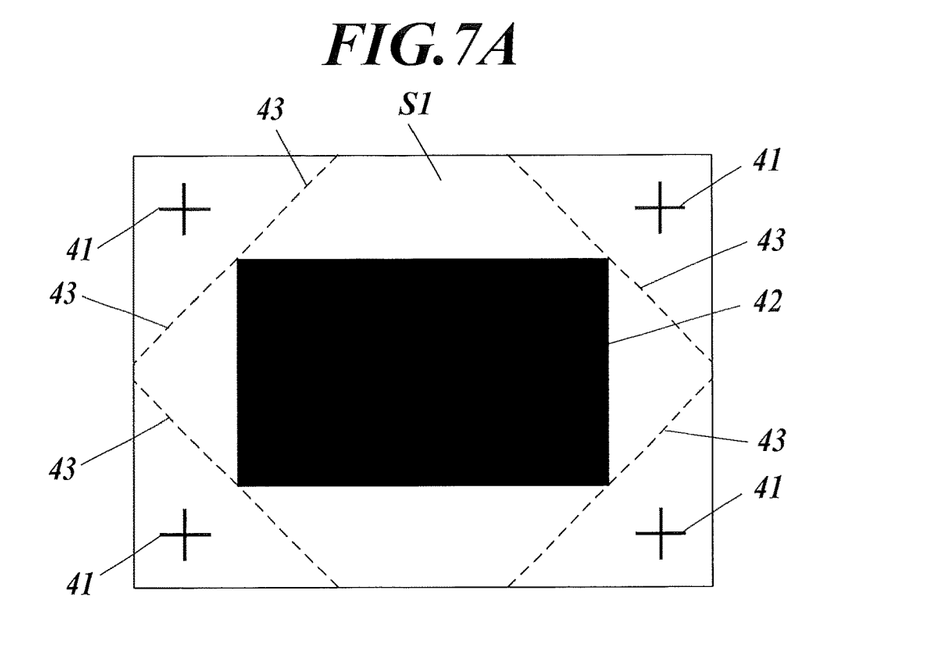
FIG. 7A illustrates a variation of an alignment sheet.

For example, FIG. 7A illustrates another example of the alignment image on the front side S1 of the alignment sheet S, in which cross marks 41 are formed in the corners as the reference image, and a single solid rectangle 42 is formed in the center as the background image (second background image), and folding lines 43 are formed as the folding position indicator image.

Figure 7B:
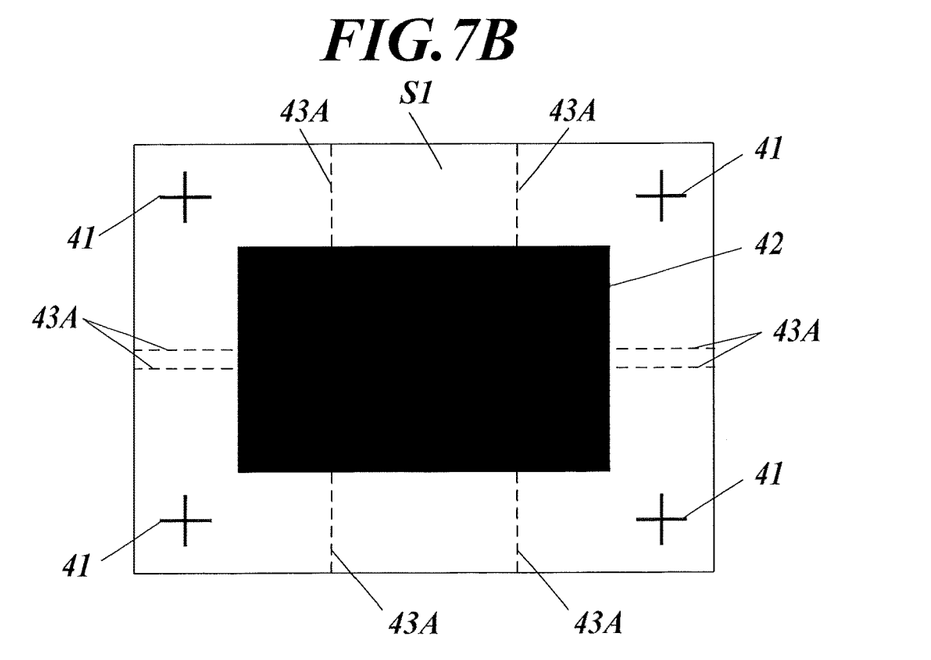
FIG. 7B illustrates a variation of an alignment sheet.

FIG. 7B illustrates yet another example in which the same cross marks 41 and solid rectangle 42 as the example of FIG. 7A are formed, and marks 43A indicating the positions of the edges of the folded corner areas are formed as the folding position indicator image.

Including the above-described examples, the folding position indicator image may be any image that can indicate the folding positions.

Figure 8:
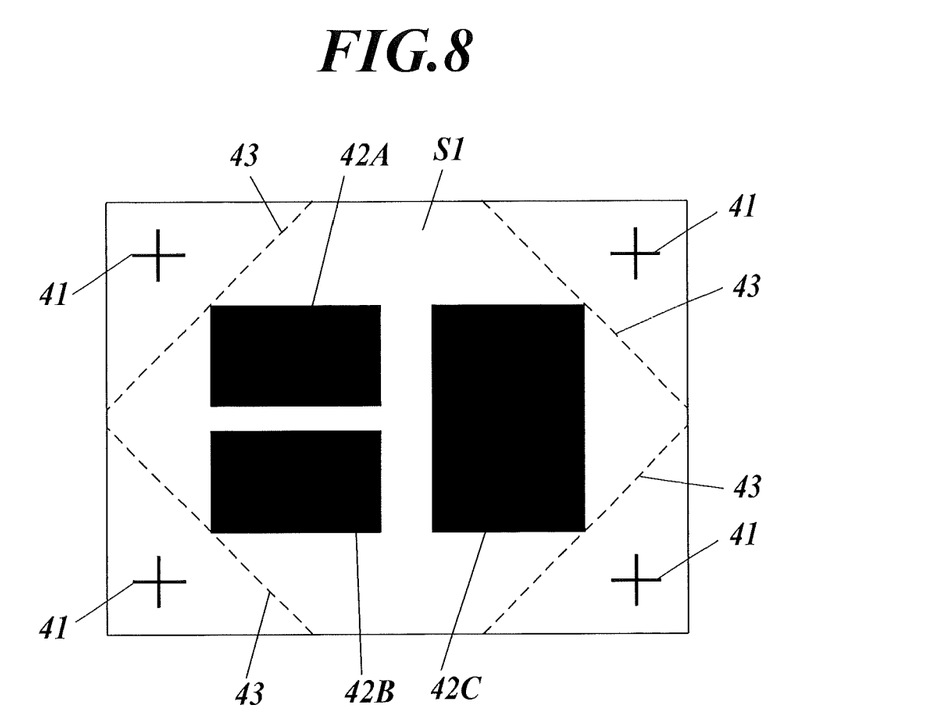
FIG. 8 illustrates a variation of an alignment sheet.

As illustrated in FIG. 8, the background image may be constituted by three separate solid FIGS. 42A to 42C so that the sheet direction is recognizable.

The reference image and/or background image on the front side S1 may be different from that of the back side S2. This makes the two sides more distinguishable from each other, and can therefore prevent a mistake in the folding step.

Figure 9A:
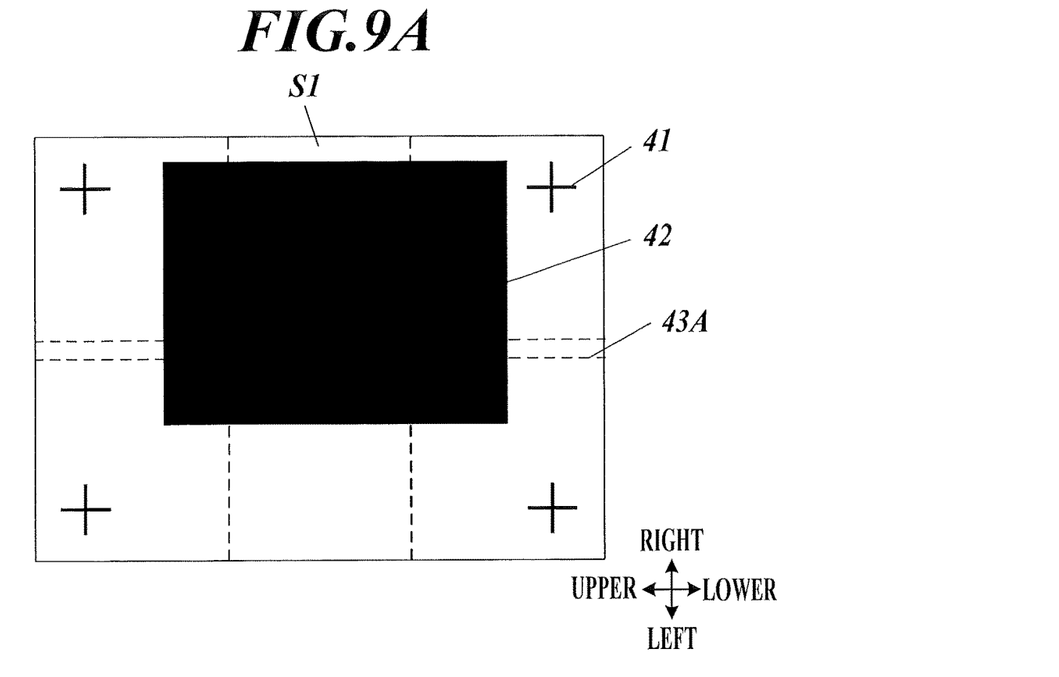
FIG. 9A illustrates a variation of an alignment sheet.
Figure 9B:
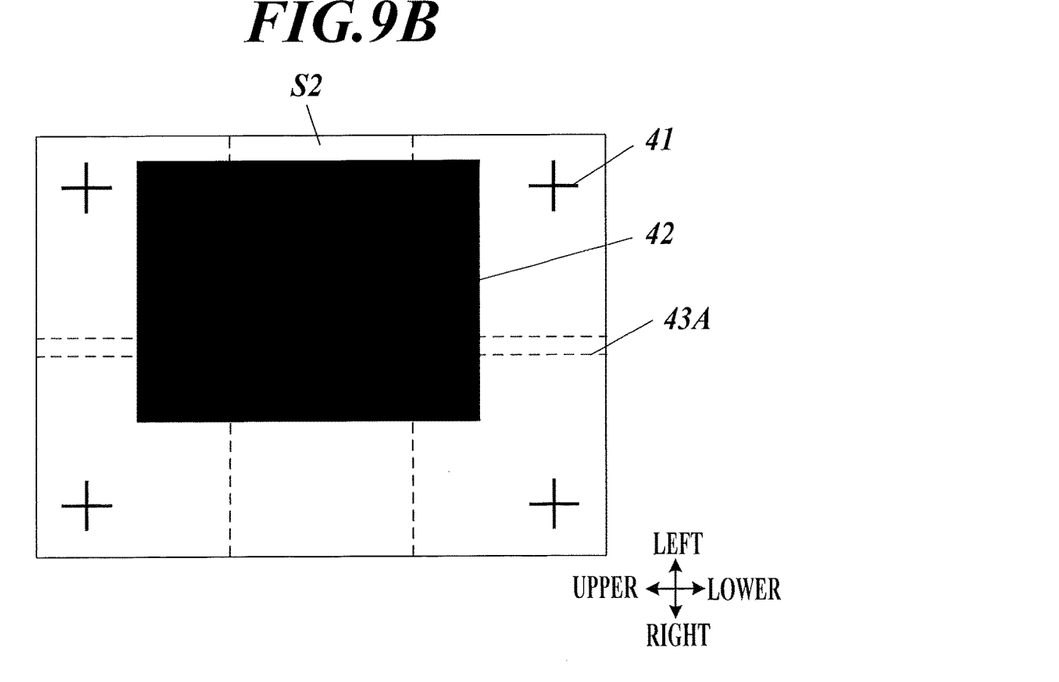
FIG. 9B illustrates a variation of an alignment sheet.

Specifically, as illustrated in FIG. 9A and FIG. 9B, the background images (solid FIG. 42) on the front side S1 and the back side S2 may be formed at different locations so that they do not coincide with each other.

Although not shown in the figure, the figure, density or color of the background images on the front side S1 may be different from that of the back side S2, or the figure or size of the reference images on the front side S1 may be different from that of the back side S2.

Plural types of alignment image data for forming the alignment sheet S may be stored in the storage section 11.

In this case, the alignment image data used in the duplex alignment mode may be selected according to the type (e.g. photograph, text, and the like) of images to be formed in the subsequent duplex image forming mode.

Alternatively, the alignment image data for forming the alignment sheet may be selected based on the size of filled areas (coverage rate) in past image forming. That is, the size of filled areas in past image forming may be stored in the storage section 11, and an alignment image data that has an image area (coverage rate) similar to the average thereof may be selected.

Alternatively, the alignment image data that is used most frequently may be selected based on the use history of the alignment image data in the past.

It should be understood that the alignment data may also be selected according to user preference.

In the above-described embodiment, the four corners of the alignment sheet S are folded. Instead, the value may be calculated by folding the upper and lower ends and the right and left ends of the alignment sheet S.

This U.S. patent application claims priority to Japanese patent application No. 2014-146382 filed on Jul. 17, 2014, the entire contents of which are incorporated by reference herein for correction of incorrect translation.

What is claimed is:

1. A method for aligning an image forming position of a sheet, comprising:
    forming a reference image on a first side of an alignment sheet in a periphery of the first side, which is used for measuring a position of an image on the first side, the forming of the reference image on the first side of the alignment sheet being performed by an image forming apparatus;
    forming a background image on a second side of the alignment sheet, the second side being opposite the first side of the alignment sheet, the background image being formed at a location on the second side of the alignment sheet where the background image does not overlap with the reference image, the forming of the background image on the second side of the alignment sheet being performed by the image forming apparatus;
    folding at least a portion of the alignment sheet which includes the reference image to cause the portion of the alignment sheet which includes the reference image to face a same direction as the second side of the alignment sheet, so that the reference image on the first side of the alignment sheet and the background image on the second side of the alignment sheet are simultaneously visible;
    simultaneously reading the reference image and the background image from said direction using the image forming apparatus while the alignment sheet is folded so that the background image appears as a background to the reference image;
    storing alignment image data based on the simultaneous reading of the reference image and the background image in a memory of the image forming apparatus; and
    forming, by the image forming apparatus, an image at an aligned position based on the alignment image data.

2. The method according to claim 1, further comprising:
    forming, by the image forming apparatus, a folding position indicator image on the second side, which specifies a folding position,
    wherein, by folding the area with the reference image at the folding position specified by the folding position indicator image, an edge of the area with the reference image is placed on top of the background image.

3. The method according to claim 2, wherein the folding position indicator image is constituted by a folding line, a mark to which the edge of the area is folded or a mark provided in the second image.

4. The method according to claim 1, further comprising:
forming, by the image forming apparatus, a second reference image in a periphery of the second side, which is used for measuring a position of an image on the second side; and
forming, by the image forming apparatus, a second background image with a predetermined area on the first side at a location where the second background image does not overlap the second reference image,
wherein the image forming apparatus simultaneously reads the second reference image and the second background image while an area with the second reference image is folded such that the second background image appears as a background.

5. The method according to claim 4, wherein the background image and the second background image are different from each other in figure, density or color.

6. The method according to claim 4, wherein the reference image and the second reference image are different from each other in figure.

7. The method according to claim 1, further comprising:
calculating a correction value which corrects the image forming position on the sheet based on image data obtained after simultaneously reading the reference image and the background image.

8. The method according to claim 1, further comprising:
performing subsequent image forming operations with the image forming apparatus based upon the stored alignment image data.

9. An image forming apparatus, comprising:
a hardware processor configured to:
store the alignment image data for forming the alignment sheet according to claim 1 in the memory of the image forming apparatus;
form the alignment image on a sheet based on the alignment image data;
read the alignment sheet on which the alignment image is formed; and
calculate a correction value which corrects the image forming position on the sheet based on image data obtained,
wherein the hardware processor simultaneously reads the reference image and the background image from the alignment sheet while the area with the reference image is folded such that the background image appears as the background.

10. The image forming apparatus according to claim 9, wherein the hardware processor is further configured to:
store a plurality of different alignment image data, and
select the alignment image data for forming the alignment sheet based on a size of a filled area in past image forming.

* * * * *